United States Patent [19]

Pottinger et al.

[11] Patent Number: 4,624,760
[45] Date of Patent: Nov. 25, 1986

[54] FILTER CLEANING

[75] Inventors: John S. Pottinger, Newbury; Andrew D. Turner, Abingdon; William R. Bowen, Wantage; Dennis R. Cox, Reading, all of England

[73] Assignee: United Kingdom Atomic Energy Authority, London, England

[21] Appl. No.: 742,709

[22] Filed: Jun. 7, 1985

[30] Foreign Application Priority Data

Jun. 21, 1984 [GB] United Kingdom ............... 8415887

[51] Int. Cl.$^4$ ............................................. C25F 1/00
[52] U.S. Cl. .............................. 204/141.5; 210/636; 210/748; 204/145 R
[58] Field of Search ............... 210/636, 748; 204/402, 204/141.5, 130, 278, 145 R

[56] References Cited

U.S. PATENT DOCUMENTS

| 3,912,624 | 10/1975 | Jennings | 210/636 |
| 4,231,865 | 11/1980 | Spiegler | 210/636 |
| 4,256,551 | 3/1981 | Cliff et al. | 204/278 |
| 4,493,756 | 1/1985 | Degen et al. | 204/141.5 |
| 4,548,693 | 10/1985 | Kadija et al. | 204/252 |

FOREIGN PATENT DOCUMENTS

| 53-108882 | 9/1978 | Japan | 210/636 |
| 1044963 | 10/1966 | United Kingdom . | |
| 1089458 | 11/1967 | United Kingdom . | |

Primary Examiner—Benoit Castel
Attorney, Agent, or Firm—Larson and Taylor

[57] ABSTRACT

A porous electrically conducting filter, e.g. a membrane for filtration equipment, is cleaned by setting up an electrochemical cell comprising the membrane as a first electrode (usually the cathode), a second electrode, and an electrolyte capable of being electrolyzed to a gaseous product at the first electrode. When a potential is applied across the cell, the gaseous product of electrolysis (e.g. in the form of microbubbles) cleans the surfaces of the membrane by forcing foulant material therefrom.

The electrolyte is constituted by the liquid being filtered (with the possible addition of a salt to increase electrical conductivity, if necessary) thus enabling filter cleaning to be carried out in situ while the liquid being filtered continues to be passed through the filter.

6 Claims, 6 Drawing Figures

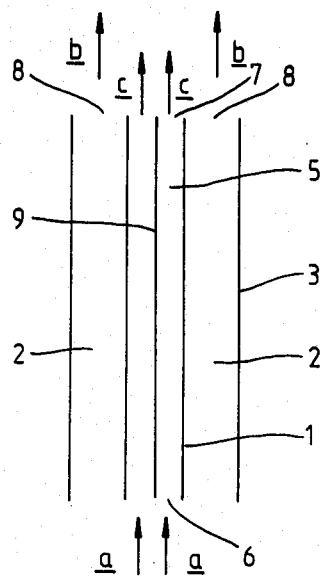
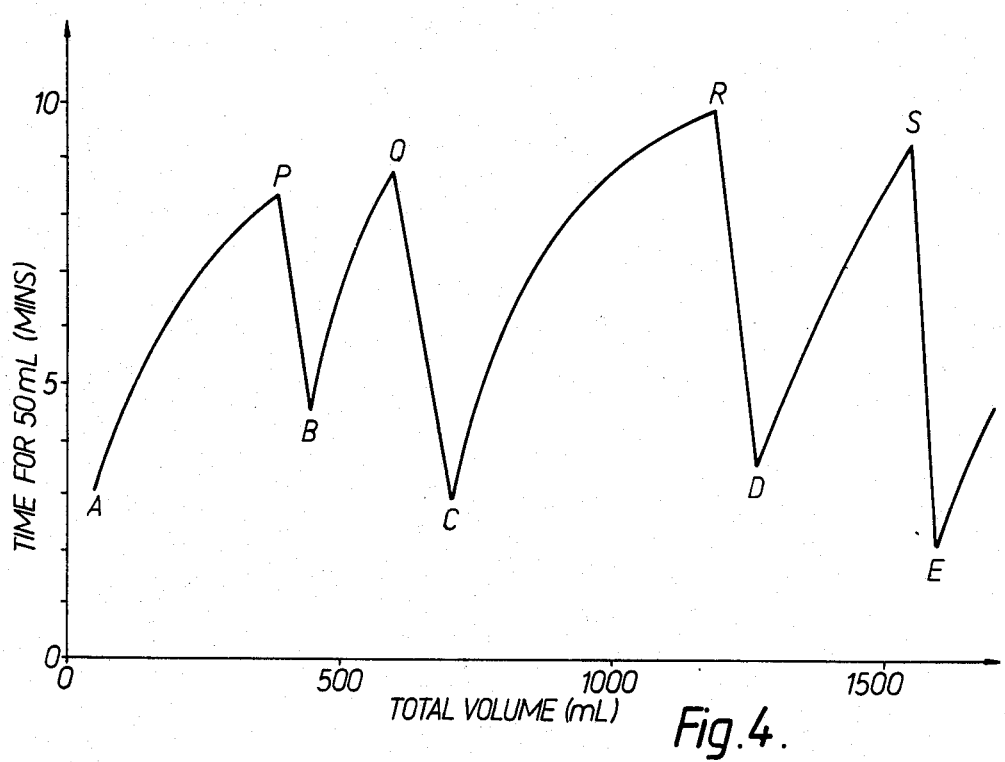
Fig. 3.
Fig. 4.

FILTER CLEANING

BACKGROUND OF THE INVENTION

This invention relates to the electrochemical cleaning of electrically conducting filters.

Filtration is a widely used industrial process and the fouling of filters such as membranes used therein may be a considerable problem, especially in microfiltration and ultrafiltration. Thus, such fouling reduces membrane fluxes, and the resulting need for cleaning treatment increases the complexity of filtration equipment, involves loss of time, and decreases membrane lifetime. Conventionally, such cleaning treatment is carried out by chemical dissolution of foulant material or by backwashing. In a typical example, the membranes of microfiltration units for breweries and distilleries have to be cleaned every 2 to 4 hours where the actual cleaning treatment operation takes 1 to 2 hours.

SUMMARY OF THE INVENTION

The invention provides a more rapid and less plant-intensive method of cleaning filters than described above. It is carried out in situ during operation of filtration equipment and is applicable where the membrane is electrically conducting. Thus, in one aspect, the invention provides a method of cleaning a porous electrically conducting filter during use of the filter in the treatment, by filtration, of an aqueous process liquid comprising the steps of (i) establishing an electrochemical cell comprising a first electrode constituted by the filter, a counter electrode, and an electrolyte constituted by the process liquid, and (ii) operating the cell to electrolyse the electrolyte thereby generating a gaseous product of said electrolysis at the filter to effect cleaning thereof.

In the practice of the invention, the process liquid may be caused to flow continuously through the filter and the cell operated periodically, as and when required, to effect cleaning of the filter.

The gaseous product may be generated in the form of microbubbles at the surfaces of the filter; the microbubbles force foulant material away from the surfaces thereby cleaning the filter.

Preferably, the first electrode constitutes the cathode of the cell and the second electrode the anode; when using certain filter materials, however, the first electrode may constitute the anode and the second electrode the cathode.

The invention enables very rapid, direct cleaning of fouled filters to be effected merely by connection of the filter and a counter electrode to a source of potential difference and utilisation of the liquid being filtered as electrolyte. If necessary, the electrical conductivity of the liquid may be increased to facilitate electrolysis by addition of a suitable salt or salts. The counter electrode may, if desired, be constituted by an electrically conducting part of the filtration equipment incorporating the filter. Filter fluxes are maintained and filter cleaning time reduced or eliminated thereby enabling plant size to be reduced. Also, filter lifetime is increased.

The invention is of particular advantage in downstream processing in the biotechnology industries where fouling is an acute problem. Also, the invention may extend the use of filters to industrial processes where fouling has hitherto precluded their large scale use, for example the separation of pulp wastes in the paper industry.

Examples of filters to which the invention is applicable are metallic microporous membranes such as those of stainless steel mesh or sintered stainless steel, microporous graphite membranes and conducting ceramic microfiltration and ultrafiltration membranes exemplified by metal oxide membranes such as doped titania or zirconia.

In another aspect, the invention provides a filtration apparatus comprising a first flow chamber having an inlet thereto for inflow of an aqueous process liquid and an outlet therefrom for outflow of concentrated process liquid;

a second flow chamber adjacent to the first flow chamber and separated therefrom by a porous electrically conducting filter, the second flow chamber having an outlet therefrom for outflow of filtered process liquid;

a counter electrode positioned to be in contact with the process liquid in use of the apparatus; and means for connecting the filter as a first electrode and the counter electrode to a source of electromotive force wherein the process liquid constitutes the electrolyte and electrolysis thereof effects cleaning of the filter.

The chamber, if made of electrically conducting material, may conveniently constitute the counter electrode.

BRIEF DESCRIPTION OF THE DRAWINGS

Several ways of carrying out the invention will now be particularly described by way of example. Reference will be made to the accompanying drawings wherein:

FIG. 3 is a schematic diagram of another form of cross-flow filtration apparatus of the invention;

FIG. 4 shows graphically experimental data obtained using the invention to clean a membrane used in the filtration of an iron(III) hydroxide slurry.

DESCRIPTION OF THE PREFERRED EMBODIMENTS

Figure 1:
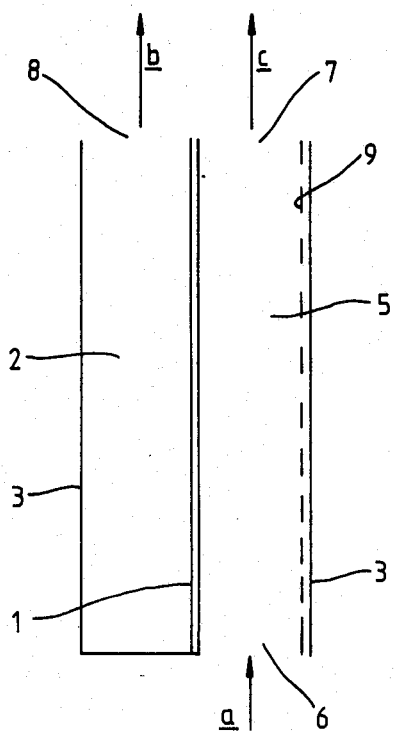
FIG. 1 is a schematic diagram of a cross-flow flat-sheet filtration apparatus of the invention.

Referring to FIG. 1, a first flow chamber 5 of a filtration apparatus is defined within a module casing 3 and has an inlet 6 for inflow of aqueous process liquid and an outlet 7 for outflow of concentrated process liquid. A second flow chamber 2 is also defined within the module casing 3 and is adjacent to the first chamber 5 and separated therefrom by a flat-sheet microporous filtration membrane 1 of electrically conducting material. The second chamber 2 has an outlet 8 for outflow of filtered process liquid. A counter electrode 9 is positioned in the first chamber 5 adjacent a wall of the casing 3. The membrane 1 is connectable to the negative pole of a source of potential difference by means not shown and the counter electrode 9 to the positive pole of the source of potential difference by means not shown.

In operation of the apparatus shown in FIG. 1, an aqueous process liquid to be filtered is passed continuously into the first chamber 5 via inlet 6 as shown by arrow(s) a and thence through the membrane 1. Filtered process liquid thereby passes into the second chamber 2 and flows out of the apparatus via outlet 8 as shown by arrow(s) b. The solid content of the process liquid is either retained on the surface of the membrane 1 to constitute foulant material or passes from the first chamber 5 via outlet 7 together with process liquid that has not passed through the membrane 1 as shown by arrow(s) c.

When it is desired to remove foulant material from the membrane 1, a potential difference is applied between the membrane 1 and the counter electrode 9. The liquid in the first chamber 5 is electrolysed giving rise to bubbles at the surface of the membrane 1 which force the foulant material therefrom. The foulant material is thence removed from the first chamber 5 in the direction shown by the arrow(s) c. Application of the potential difference may be discontinued as soon as the membrane 1 is sufficiently cleaned of foulant material.

Figure 2:
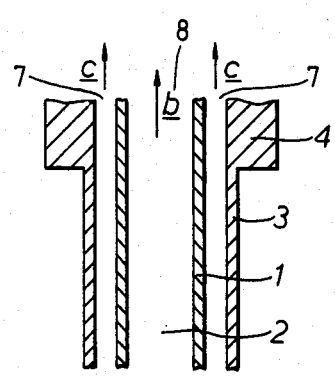
FIG. 2 is a schematic cross-section of an annular cross-flow filtration apparatus of the invention.
Figure 2:
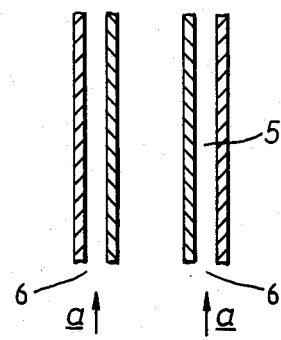

Referring to FIGS. 2 and 3 respectively, cross-flow filtration apparatus of analogous design and method of operation to those of the apparatus shown in FIG. 1 are depicted. Components having the same general function have been given the same reference numerals as in FIG. 1 and arrows have been given the same reference letters. Some points of difference between the components of FIG. 2 and those of FIG. 1 are as follows:
the membrane 1 is tubular,
the casing 3 is tubular and has a boss 4,
the first chamber 5 is annular and the second chamber 2 cylindrical,
the boss 4 is connectable to the positive pole of the source of potential difference so that the casing 3 constitutes the counter electrode, i.e. a separate counter electrode is not necessarily provided in the apparatus of FIG. 2.

Some points of difference between the components of FIG. 3 and those of FIG. 1 are as follows:
the membrane 1 is tubular,
the casing 3 is tubular,
the first chamber 5 is cylindrical and the second chamber 2 annular,
the counter electrode 9 is of wire and is centrally positioned in the first chamber 5.

EXAMPLE 1

2L of an aqueous slurry of 16 $gL^{-1}$ iron(III) hydroxide at pH 12 was continuous filtered in a flow recycling mode using a cross-flow filtration apparatus as shown in FIG. 1 having a stainless steel mesh membrane of effective pore size 8 $\mu m$ and area 75 $cm^2$. The slurry was passed through the apparatus at 6 psi.

The time taken for 50 mL of liquid to be collected after passage through the membrane was measured continuously. This time is an inverse measure of the membrane flux which was found to decrease as membrane fouling took place. A potential (or pulse) was subsequently applied between the membrane (as cathode) and a second electrode (as anode) for a certain period of time in order to clean the membrane. The original membrane flux was then restored. The process was repeated several times until the supply of slurry was exhausted.

The results are summarised graphically in FIG. 4 where the horizontal axis represents the total volume of liquid collected in 50 mL quanta and the vertical axis represents the time taken for 50 mL of liquid to be collected. Point A on the graph indicates the initial time for such collection and points B, C, D and E indicate times for such collection after application of a potential to clean the membrane. Points P, Q, R and S indicate application of a potential, where the conditions of application of the potential at each of these points is summarised in the table below.

| POINT | VOLTS | AMPS | TIME (MINS) |
|---|---|---|---|
| P | 36 | 31 | 1½ |
| Q | 36 | 32 | 2 |
| R | 36 | 33 | 2 |
| S | 36 | 20 | 2 |

It will be observed from the graph of FIG. 4 that the initial membrane flux (point A) was substantially restored following each application of a potential at P, Q, R and S.

EXAMPLE 2

5L of an aqueous slurry containing 1% $TiO_2$ at pH 9.75 was filtered in a continuous flow recycling mode using a cross-flow filtration apparatus as shown in FIG. 1 having a stainless steel mesh membrane of effective pore size 6-7 $\mu m$ and area 75 $cm^2$. The slurry was passed through the apparatus at 3 psi.

Testing was carried out as described in Example 1 except that the pulse was 12 V at 5 A for 5 seconds at the beginning of the test, increasing gradually to 26 V at 12 A for 5 seconds at the end of the test. Such pulsing allowed the slurry to be concentrated from 1% $TiO_2$ to 25% $TiO_2$ while maintaining an essentially constant membrane flux.

Figure 5:
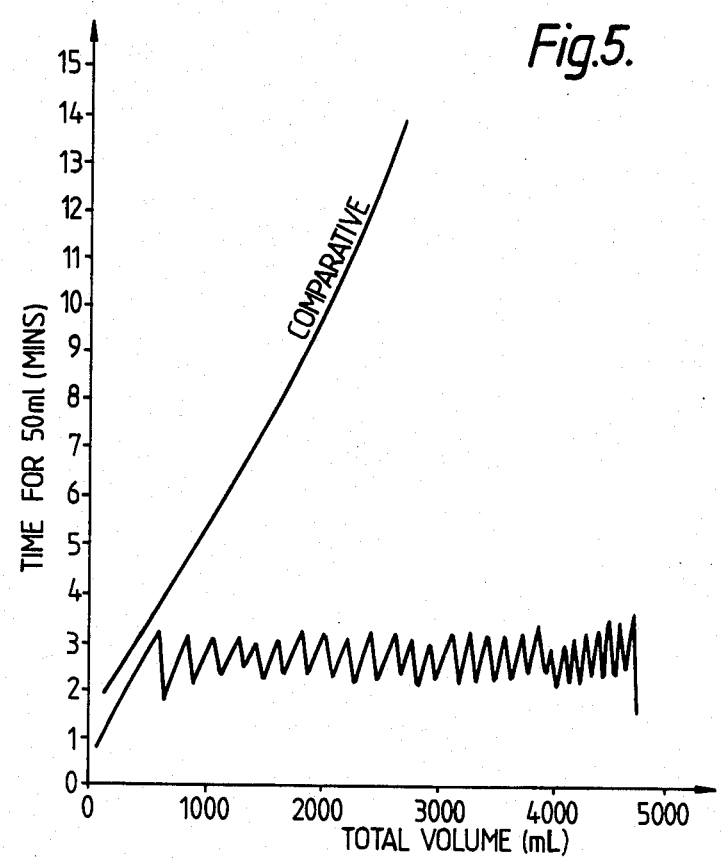
FIG. 5 shows graphically experimental data obtained using the invention to clean a membrane used in the filtration of a titanium dioxide slurry.

The results are summarised graphically in FIG. 5 where the axes are as in FIG. 4. For comparison purposes, FIG. 5 also shows, identified as "COMPARATIVE", the time for collection of 50 mL of liquid when membrane cleaning was not carried out. Referring to FIG. 5, each peak of the zig-zag curve indicate application of the pulse and the next succeeding minimum after each peak indicates the effect of the application of the pulse. It will therefore be observed that membrane flux was substantially maintained by periodic application of the pulses. The comparative curve on FIG. 5 shows that membrane flux decreases regularly in the absence of the pulses. By the time the liquid has been concentrated to just 2.3% $TiO_2$ the flux had decreased to only about one fifth of that maintained by application of pulses.

EXAMPLE 3

An aqueous dispersion of 5 $gL^{-1}$ DCL Bakers yeast in phosphate buffer at pH 7 was continuously filtered using a cross-flow filtration apparatus as shown in FIG. 3 having an annular membrane consisting of a layer of zirconia deposited on a microporous graphite tube. The molecular weight cut-off of the membrane was in the range $10^4$–$10^5$ and the membrane area was 10 $cm^2$. The dispersion was passed through the cell at 8 psi.

Figure 6:
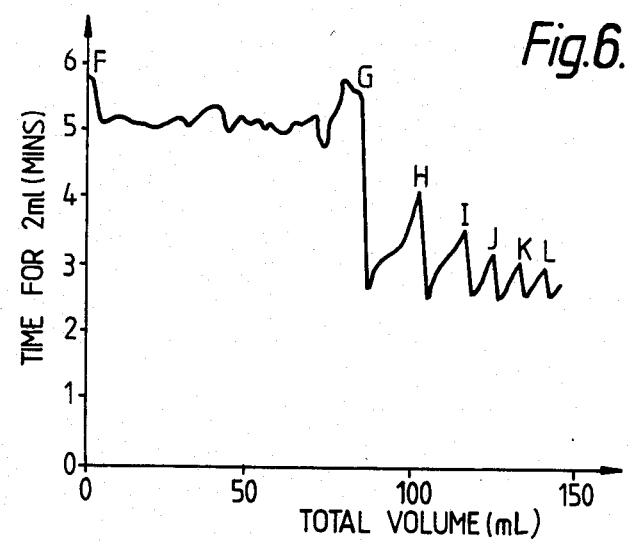
FIG. 6 shows graphically experimental data obtained using the invention to clean a membrane used in the filtration of a Baker's yeast slurry.

The time taken for 2 mL of liquid to be collected after passage through the membrane was measured continuously. The results are shown in FIG. 6 where the horizontal axis represents the total volume of liquid collected and the vertical axis represents the time taken for 2 mL of liquid to be collected. Referring to FIG. 6, no potential was applied from point F to point G on the graph. At points G, H, I, J. K and L pulses of 14 V at 1 A for 15 seconds were applied and it will be seen that the membrane flux was appreciably improved by these pulses.

We claim:

1. A method of cleaning a porous electrically conducting filter during use of the filter in the treatment, by filtration, of an aqueous process liquid comprising the steps of
   (i) establishing an electrochemical cell comprising a first electrode constituted by the filter, a counter electrode, and an electrolyte constituted by the process liquid, and
   (ii) operating the cell to electrolyze the electrolyte thereby generating a gaseous product of said electrolysis at the filter to effect cleaning thereof, the process liquid being caused to flow continuously through the filter and the cell being operated periodically to effect said cleaning of the filter.

2. A method as claimed in claim 1 wherein the first electrode is the cathode of the cell and the counter electrode the anode.

3. A method as claimed in claim 1 wherein one or more salts is additionally provided in solution in the process liquid to facilitate its electrolysis.

4. A method as claimed in claim 1 wherein the filter is a metallic microporous membrane.

5. A method as claimed in claim 4 wherein the membrane is of stainless steel mesh or sintered stainless steel.

6. A method as claimed in claim 1 wherein the filter is a ceramic membrane.

* * * * *